March 6, 1928.
T. H. RORKE
1,661,269
AUTOMOBILE WATER GAUGE
Filed July 20, 1925
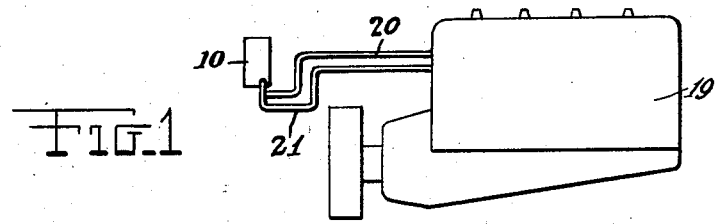
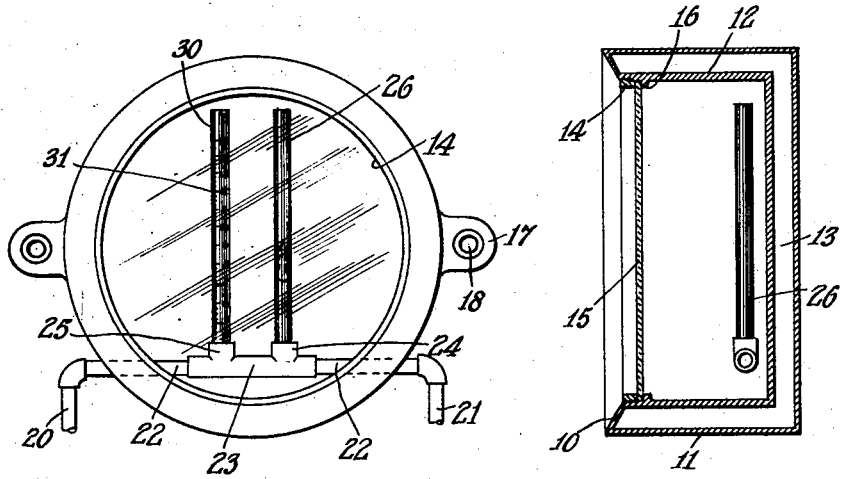
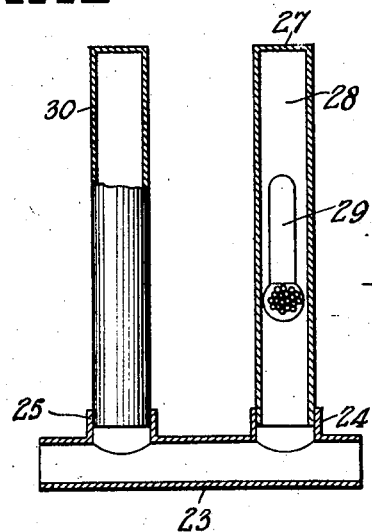
INVENTOR
*T. H. Rorke*
BY
ATTORNEY Patented Mar. 6, 1928.

1,661,269

UNITED STATES PATENT OFFICE.

THOMAS H. RORKE, OF BROOKLYN, NEW YORK.

AUTOMOBILE WATER GAUGE.

Application filed July 20, 1925. Serial No. 44,643.

The main object of this invention is to provide a gauge which may be suitably mounted upon the instrument board of an automobile or the like for the purpose of disclosing the important changes and conditions of the water cooling medium of the engine.

Another object is to provide a gauge for disclosing the temperature of the water, the level of the water in the cooling system, the sufficiency of anti-freeze mixture in the water, and the degree of purity of the water, these four conditions being disclosed by the perusal of the water glasses in the gauge.

The above and other objects will become apparent in the description below, in which characters of reference refer to like-named parts in the drawing.

Referring briefly to the drawing, Figure 1 is an elevational view, showing the application of the gauge.

Figure 2 is a front elevational view of the gauge, showing the construction thereof.

Figure 3 is a sectional side elevational view of the gauge.

Figure 4 is an enlarged elevational view of the water glasses used for ascertaining the condition of the water in the cooling system of an engine to which the device is attached.

Referring in detail to the drawing, the numeral 10 indicates the body of the casing which consists of an outer cylindrical cup 11 and an inner cup 12 of smaller dimensions than the outer. The inner and outer cups are joined integrally to each other having a bottom and encircling walls between which a space or gap 13 is formed, said space or gap being adapted to be filled with any desirable heat insulating material such as asbestos or the like. The outer cup is originally fashioned as a sleeve and after the space between the inner and outer cups is filled with asbestos, the edge of the bottom is fixed to the outer cup. At the open end of the inner cup 12, which is located at the front of the casing, threads are formed upon the interior surface of the cup and which are engaged by the threads of a ring 14 which retains a transparent glass lens 15 securely in place upon a shoulder 16. The outer casing is provided with a pair of oppositely disposed ears 17 which serve the purpose of mounting the entire casing upon an instrument board or the like by passing screws thru the openings 18 formed in said ears.

This gauge is connected to the water jacket 19 of the automobile engine by tapping one end of a delivery pipe 20 and an exhaust pipe 21 to said jacket, one pipe being tapped to the water jacket above the other in order to produce circulation of the water from the jacket thru the pipes 20 and 21. The delivery and exhaust pipes 20 and 21 pass rearwardly on the vehicle between the water jacket and the casing of the gauge and enter the gauge thru openings formed at the lower end of the casing. Within the casing, sections of pipe 22 extend toward each other on the same axis and are coupled or joined by a double branch T 23 which has outlet sleeves 24 and 25, said sleeves having their axes extending vertically upward. The sleeve 24 has the lower open end of a tubular transparent glass 26 mounted therein. This glass is sealed at its upper end by a roof 27 and within its chamber 28, a hydrometer bulb 29 is movably housed. The opposite sleeve 25 also has the lower end of a glass transparent tube 30 mounted therein. This glass tube 30 is closed at both ends and is partly filled with mercury or some other compound which may be expanded or contracted by the heat variation. This glass tube comprises the thermometer of the instrument and is provided with graduations 31 thruout its length, some of which have numerals inscribed beside them to indicate the temperature at the given point.

The device is used to indicate the various conditions of the water. The gauge is mounted within the automobile at such a horizontal level that the tops of the tubes 26 and 30 lie below the upper level of the motor, as shown in Fig. 1. The level of the water in the cooling system is indicated by the surface which appears in the water column or glass 26. As the upper end of the column 26 is sealed, the relative variation of the height of water in the column will be small compared to the variation of the level in the motor. This column is therefore calibrated for a given motor before mounting, so that it my read the number of gallons of water in the cooling system, or in any other desired manner. Since the prime use of the gauge is to indicate the fact that the system requires water to be added, and since it is the amount of water needed to fill the system that is to be indicated, the gauge may be calibrated to read downward in gallons or other units which the system has lost after having been filled. The range of the gauge need not exceed one or two gallons, as serious trouble is apt to arise if more than one or two gallons have been lost, and it is the object of this gauge to warn the driver of the need for water before trouble arises. This column or glass 26 also shows the purity of the water as said water is constantly visible in the glass and by its rust or sediment condition as shown in the column, its purity or cleanliness may be seen. If the water appears clouded, it will be readily seen by the observer that a new filling is necessary. The device also indicates what percentage of anti-freeze mixture is suspended in the water cooling medium thru the aid of the floating hydrometer 29 and the percentage of anti-freeze mixture in the water is disclosed by the depth to which the bulb or lower end of the hydrometer sinks into the surface of the liquid in the column 26. The temperature of the water is disclosed by the opposite column or glass tube 30 thru the aid of the graduations 31 thereon. As the water circulates around the lower end of the column 30, the expansible liquid therein will be varied by the water in circulation thru the double T fixture and the upper mark of this expansible liquid will indicate the temperature of the water cooling medium. It will be seen that with this device, a number of conditions of the water in the cooling system in an automobile may be disclosed by reading the columns 26 and 30 in the casing of the device. The conditions are the degree of purity of water, the proportion of anti-freeze mixture therein, the level of the water in the cooling system, and the temperature of the water, all of which may be instantly read from the two columns.

I claim:—

In combination with a water cooled combustion engine having a water jacket, a device for indicating the condition of the water cooling medium comprising a pair of parallel vertical columns communicating with each other at the bottom, a double T supporting said columns, one column adjacent the other, a delivery and return pipe connected to said T and the water jacket of the combustion engine, the delivery and return pipe being positioned at opposite ends of the T, a hydrometer in one of said columns for indicating the percentage of anti-freeze mixture in the water cooling medium, one of said columns being closed at the upper end and open at the bottom adapted to permit the level of the water cooling medium to rise therein, the opposite column comprising a graduated thermometer adapted to be mounted vertically on the T, the water being adapted to circulate freely around the lower end of the thermometer in the T, and a casing having the columns and T mounted therein.

In testimony whereof I affix my signature.

THOMAS H. RORKE.